United States Patent [19]

Uehara et al.

[11] Patent Number: 4,887,153
[45] Date of Patent: Dec. 12, 1989

[54] ELECTRONIC ENDOSCOPE APPARATUS USING HORIZONTAL TRANSFER CLOCK OF FIXED FREQUENCY

[75] Inventors: Masao Uehara; Masahiko Sasaki; Masahide Kanno, all of Hachioji; Jun Hasegawa, Hino; Shinji Yamashita; Katsuyoshi Sasagawa, both of Hachioji, all of Japan

[73] Assignee: Olympus Optical Co., Ltd., Tokyo, Japan

[21] Appl. No.: 241,729

[22] Filed: Sep. 8, 1988

Related U.S. Application Data

[62] Division of Ser. No. 134,627, Dec. 16, 1987, Pat. No. 4,816,909.

[51] Int. Cl.$^4$ .......................... A61B 1/04; H04N 7/18
[52] U.S. Cl. ........................................ 358/98; 358/42; 358/213.26; 128/6
[58] Field of Search ............... 358/98, 180, 42, 213.23, 358/213.26, 42, 44; 128/4, 6

[56] References Cited

U.S. PATENT DOCUMENTS

| | | |
|---|---|---|
| 4,593,313 | 6/1986 | Nagasaki et al. . |
| 4,656,508 | 4/1987 | Yokota . |
| 4,667,229 | 5/1987 | Cooper et al. . |
| 4,737,842 | 4/1988 | Nagasaki et al. . |
| 4,821,116 | 4/1989 | Nagasaki et al. ..................... 358/98 |
| 4,831,444 | 5/1989 | Kato ................................. 358/98 X |

FOREIGN PATENT DOCUMENTS

| | | |
|---|---|---|
| 2515148 | 10/1976 | Fed. Rep. of Germany . |
| 3109258A1 | 3/1982 | Fed. Rep. of Germany . |
| 3429811A1 | 4/1985 | Fed. Rep. of Germany . |
| 61-48333 | 3/1986 | Japan . |
| 61-163316 | 7/1986 | Japan . |
| 62-164433 | 7/1987 | Japan . |
| 62-213387 | 9/1987 | Japan . |

Primary Examiner—Howard W. Britton
Assistant Examiner—Victor R. Kostak
Attorney, Agent, or Firm—Armstrong, Nikaido, Marmelstein, Kubovcik & Murray

[57] ABSTRACT

The bandwidth of a signal read out from a solid-state image element is standardized by the application of a drive signal including a horizontal transfer clock of a fixed frequency to the solid-state image elements each with a different number of pixels. In consequence, part of circuitry capable of processing a signal without changing the circuit constant is increased.

30 Claims, 9 Drawing Sheets

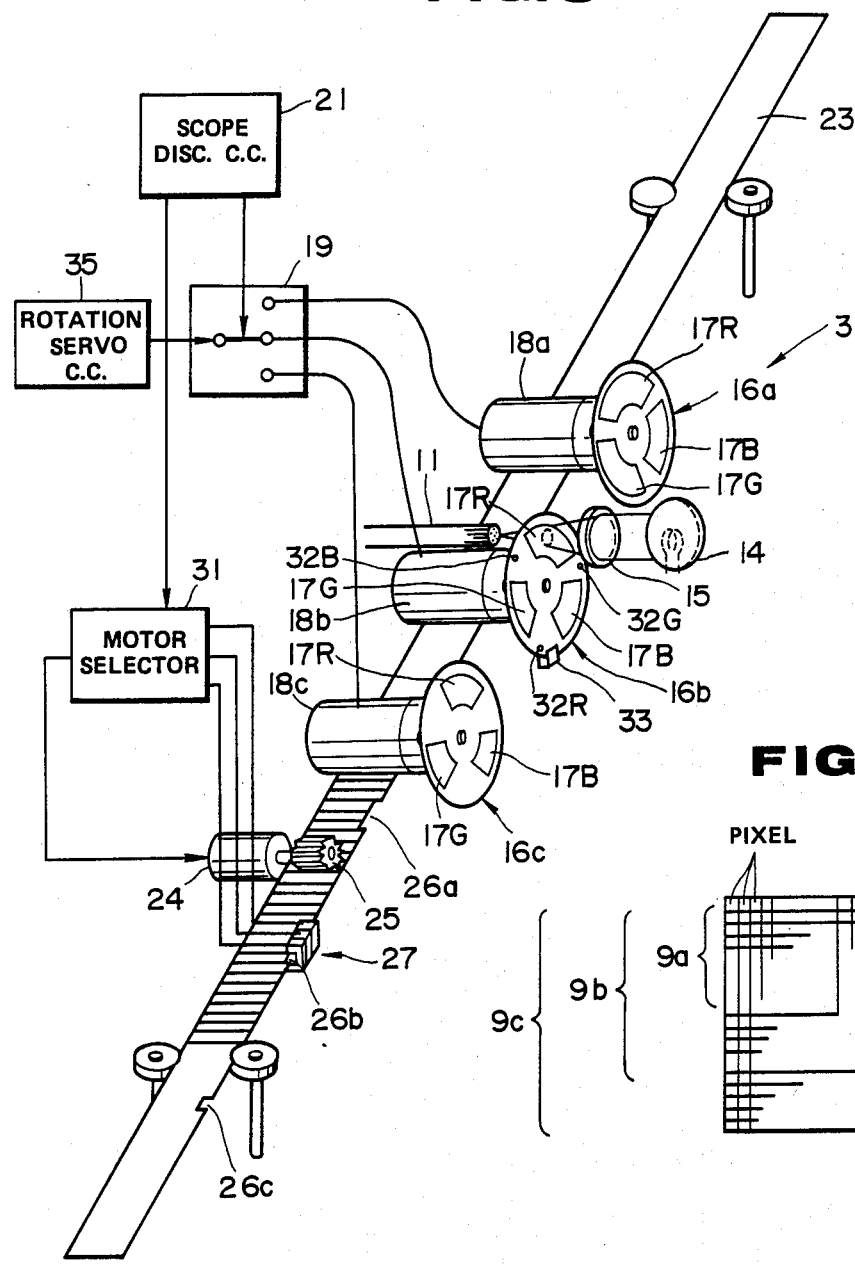
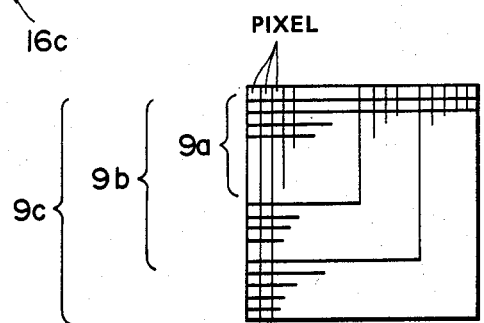

(a) (b) (c)

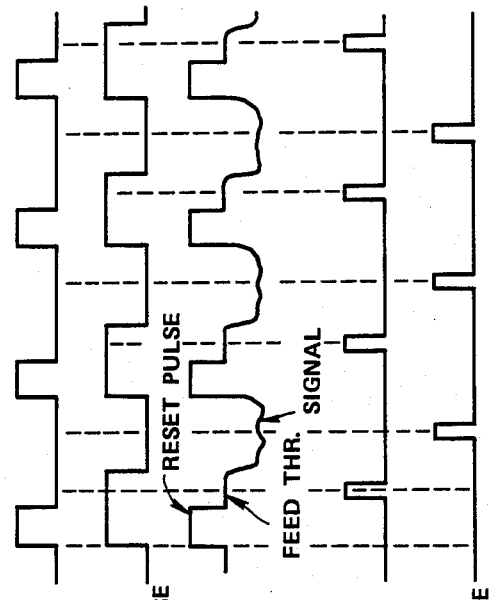
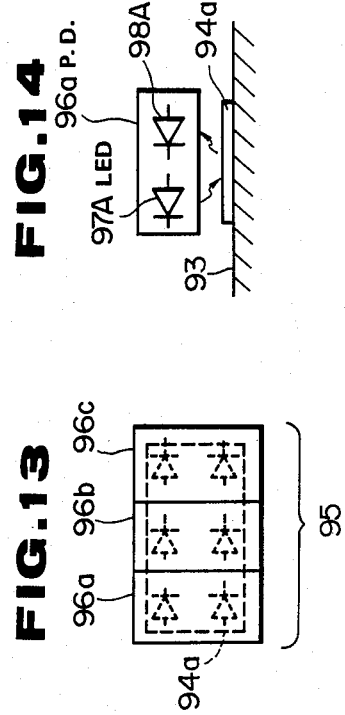
FIG. 8a RESET PULSE
FIG. 8b HORIZONTAL TRANSFER PULSE
FIG. 8c CCD OUTPUT SIGNAL
FIG. 8d CLAMP PULSE
FIG. 8e SAMPLING PULSE
FIG. 13
FIG. 14

FIG. 18a INPUT V. SYN. SIG. VD TO PHASE DET. 119

FIG. 18b INPUT P.G. PULSE TO PHASE DET. 119

FIG. 18c INPUT V. SYN. SIG. VD TO PHASE DET. 119'

FIG. 18d INPUT P.G. PULSE TO PHASE DET. 119'

ELECTRONIC ENDOSCOPE APPARATUS USING HORIZONTAL TRANSFER CLOCK OF FIXED FREQUENCY

This is a division of application Ser. No. 134,627 filed Dec. 16, 1987, , now U.S. Pat. No. 4,816,909, issued on Mar. 28, 1989.

BACKGROUND OF THE INVENTION

1. Field of the Invention:

The present invention relates to an electronic endoscope apparatus which employs a horizontal transfer clock of a fixed frequency with respect to the electronic scopes which incorporate solid state image elements each with a different number of pixels.

2. Description of the Related Art:

Recently, imaging apparatuses which employ a solid state imaging element such as a charge coupled device (hereinafter referred to as a CCD) as an imaging means have been widely used.

In the field of endoscopes, electronic endoscopes (hereinafter referred to as electronic scopes) which employ a CCD have been put into practical use and replaced the optical endoscopes (hereinafter referred to as fiberscopes) which employ an image guide for transferring an optical image.

The use of such electronic scopes have the advantage that the obtained image can be readily recorded or reproduced.

In the above-described electronic scopes, the size of an incorporated CCD determines the diameter of the portion of the electronic scope to be inserted, so CCDs having different sizes are used to enable cavities of different sizes to be observed.

These CCDs contain different numbers of pixels, depending on the type. However, the apparatus body to which the electronic scope is connected can only be used with an electronic scope incorporating one type of CCD with a particular specification, because the apparatus body incorporates a CCD drive circuit and a signal processing circuit which are designed to be used exclusively for that type of CCD.

Accordingly, the present assignee disclosed as a related technique in the specification of Japanese Patent Application No. 61-7472 an endoscope apparatus in which an oscillator and a tranfer pulse generating circuit are incorporated in each electronic scope so as to enable the remaining part of the apparatus body to be used with any scope. However, incorporation of an oscillator and other devices in each electronic scope increases the production cost and the size thereof.

The present assignee also disclosed an electronic endoscope apparatus in the specification of Japanese Patent Application No. 61-55512 in which a transfer pulse generating circuit is formed as one unit which is detachably mounted on the apparatus body. In this related technique, a drive pulse generating unit which corresponds to the employed scope must be combined to the apparatus body, making the operation complicated and increasing the possibility of erroneous operation if various types of scope are employed.

SUMMARY OF THE INVENTION

An object of the present invention is to provide an electronic endoscope apparatus which can be used with any of various electronic endoscopes that incorporate solid-state image elements each with a different number of pixels.

Another object of the present invention is to provide an electronic endoscope apparatus with a large part that can be used with any of various electronic endoscopes incorporating solid-state image elements each with a different number of pixels and which is therefore simple and inexpensive.

In the present invention, the bandwidth of a signal read out from the solid-state image element is standardized by the application of a horizontal transfer clock of a fixed frequency when solid-state image elements of different numbers of pixels are employed, thereby reducing the part of the circuit constant that has to be changed and increasing the portion of a signal processing circuit that can be used with CCDs with different numbers of pixels. This results in provision of a simple and inexpensive electronic endoscope apparatus which can cope with different numbers of pixels.

BRIEF DESCRIPTION OF THE DRAWINGS

FIG. 2 illustrates different numbers of pixels in CCDs incorporated in electronic scopes;

FIG. 3 is a schematic perspective view of a light source portion;

FIG. 8 illustrates the operation of a double sampling circuit;

FIG. 18 illustrates the operation of the motor control circuit of FIG. 17.

DESCRIPTION OF THE PREFERRED EMBODIMENTS

Figure 1:
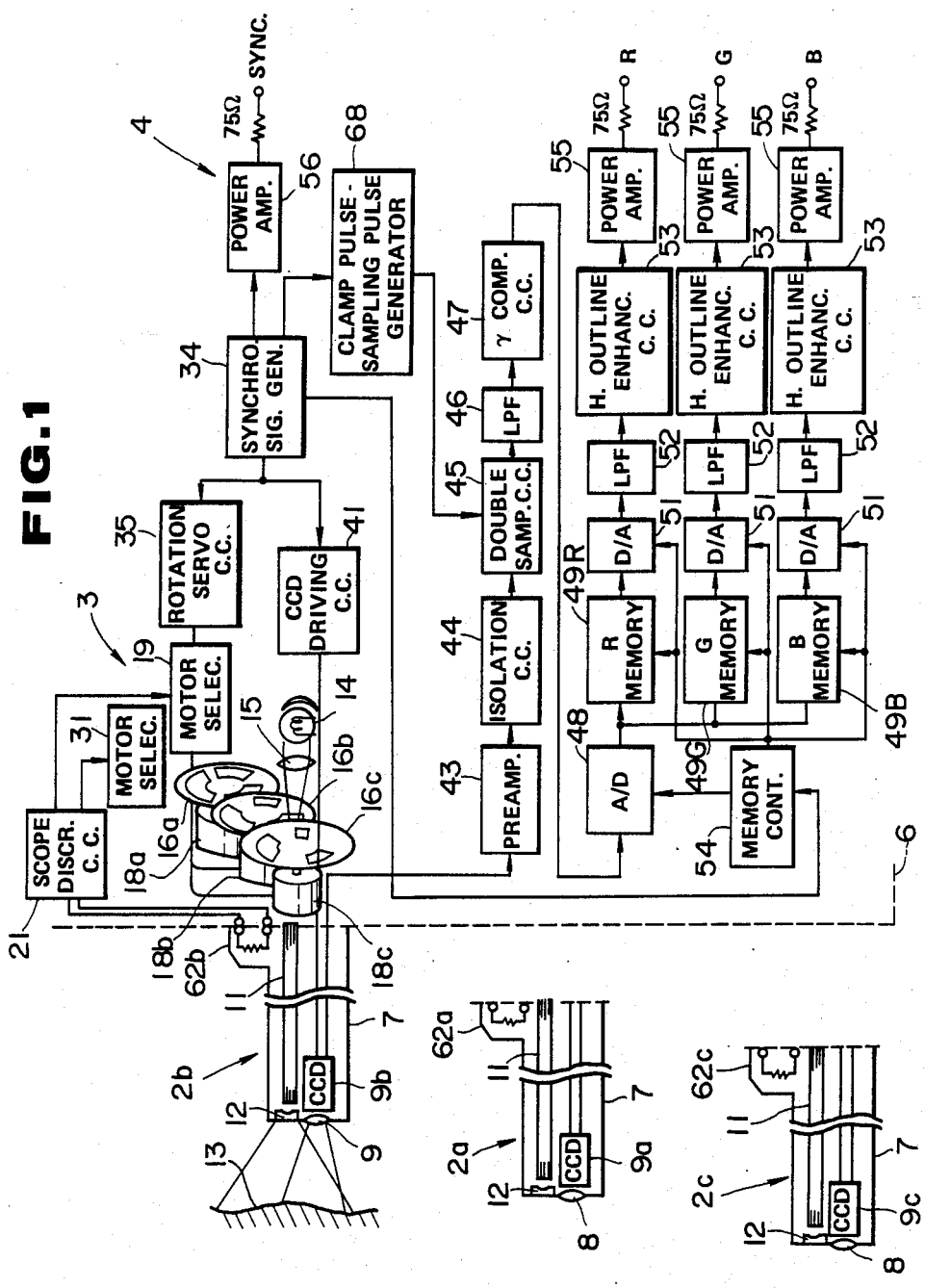
FIG. 1 is a schematic view of an electronic endoscope apparatus, showing a first embodiment of the present invention.

A first embodiment of the present invention will be described below with reference to FIGS. 1 to 11. Referring first to FIG. 1, an electronic endoscope apparatus (electronic scope apparatus) 1 includes electronic endoscopes (electronic scopes) 2a, 2b, and 2c respectively incorporating imaging means each with a different number of pixels, and an apparatus body for accommodating a light source portion 3 for supplying illumination light to a connected electronic scope 2i (i represents a, b, or c; in FIG. 1, 2b is connected), a signal processing portion 4 for converting a signal obtained by the electronic scope 2i to a video signal that can be displayed on a display device, and a scope judging means for determining which electronic scope 2i is connected and for changing the illumination period in correspondence with the number of pixels of the connected electronic scope 2i.

The electronic scope 2i has an inserted portion 7 which is elongated so that it can be easily inserted into a cavity. An objective lens 8 and a CCD 9i which serves as a solid state imaging element are disposed at the forward end of the inserted portion 7. The objective lens 8 and the CCD 9i in combination form an imaging means.

The CCD 9i contains a different number of pixels. This means that the numbers of pixels arranged in both the horizontal direction (lateral direction) and the vertical direction (longitudinal direction) differ in the CCD 9i, as shown in FIG. 2. The number of pixels in the CCD 9i (represented by 10i) has the relationship 10 $a < 10b < 10c$.

The inserted portion 7 also contains a light guide 11 for transferring illuminating light. The light guide 11 transfers the light supplied from the light source portion 3, and emits it from the forward end thereof. The emitted light is enlarged by a lens 12, and irradiates an object 13.

The light source portion 3 supplies white light from a light source lamp 14 to the incident end of the light guide 11 through a lens 15 and a rotary filter 16i selectively disposed in the light path.

The light source lamp 14 is a white light source such as Xenon lamp. The rotary filter 16i has a fan-shaped R transmitting filter 17R for transmitting light with the wavelength of red, a fan-shaped G transmitting filter 17G for transmitting light with the wavelength of green, and a fan-shaped B transmitting filter 17B for transmitting light with the wavelength of blue (see FIG. 3). This light of R, G, B colors can be radiated in a field-sequential fashion by rotating the rotary filter 16i.

The rotary filter 16i is mounted on a rotary shaft of first, second, or third motor 18i. The motor 18i is selected by a motor switch-over circuit 19.

The rotary filters 16i differ from each other in the lengths of the color filters 17R, 17G and 17B in the rotational direction, i.e., they have different field-sequential illumination periods. The first embodiment employs a drive signal of fixed frequency to cope with different numbers of pixels. Therefore, unless the rotary filter is changed (i.e., the illumination period is the same for different numbers of pixels), the read-out period must be set to a value which enables the maximum number of pixels to be read out. However, this read-out period is longer than necessary for the CCD with a small number of pixels, requiring shortening of the illumination period accordingly and causing reduction in the signal-to-noise ratio.

In order to eliminate this problem, an extra read-out period which is provided for a CCD with a small number of pixels is allotted to an illumination period in the first embodiment, thereby improving the S/N ratio. This is achieved by selectively using a rotary filter 16i which has filters with lengths corresponding to the detected number of pixels.

For example, when an electronic scope 2a with the minimum number of pixels is connected, a rotary filter 16a having the longest filters is employed. Since the illumination period is selected in accordance with the electronic scope 2i, an identifier means serving to identify the number of pixels of the electronic scope 2i is incorporated in the electronic scope 2i, and a scope discriminating circuit 2l is provided in the apparatus body 6.

Thus, the scope discriminating circuit 21 supplies through the motor switch-over circuit 19 a drive signal to the motor 18i for rotating the rotary filter 16i disposed in the light path. switching-over circuit 19. One of the three rotary filters 16a, 16b, and 16c is disposed in the light path by the scope discriminating circuit 21 in the manner described below.

The three motors 18a, 18b, and 18c are mounted on a timing belt 23 at certain intervals. The belt 23 is engaged with a gear 25 mounted on the rotary shaft of a motor 24 so that it can be moved smoothly by the motor 24 in the longitudinal direction of the belt.

Figure 4:
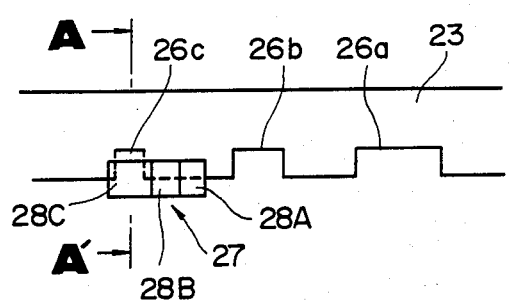
FIG. 4 is a plan view of a position detecting means of a rotary filter.
Figure 5:
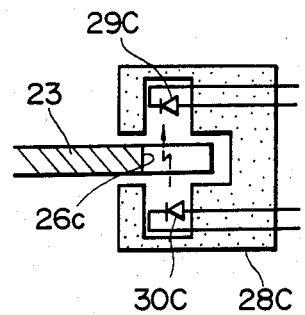
FIG. 5 is a section taken along the line A—A' of FIG. 4, showing a senser element.

The belt 23 has notches 26a, 26b, and 26c at fixed intervals, as shown in FIG. 4. The notch 26i enables position of the belt 23 (i.e., the position of the rotary filter 16i) to be detected by a position detecting sensor 27 (e.g., three photo interrupters). The notch 26i has a different width. The sensor 27 is composed of three sensor elements 28A, 28B, and 28C (each sensor element 28I (I=A, B, C) being in turn comprised of a light-emitting diode 29I and a photo diode 30I, as shown in FIG. 5), and identifies the notche 26a, 26b, or 26c utilizing the outputs of the three sensor element 28I. In other words, the motor 24 is so controlled that it moves the belt through a certain distance to a position where the notch 27a, 26b, or 26c is detected by the sensor 27. When the notch having the shortest width is moved to the sensor 27, only the photo diode 30C of the sensor element 28C receives the light through the notch, enabling the notch 26a to be identified. The detection signal of the sensor is input to a filter switch-over circuit 31, and the motor 24 is driven such that a notch 26i corresponding to the discrimination signal from the scope discriminating circuit 21 is selected. The illumination period is thus changed in accordance with the number of pixels 10i of the connected scope 2i so as to maintain the signal at a high level even when the number of pixels 10i differ (in particular, when the number of pixels is small) and thereby provide a good S/N ratio.

The rotary filter 16i is provided with means for identifying the position of the filters 17R, 17G, and 17B (which may be small holes 32R, 32, and 32B; in FIG. 3, these small holes are shown only in the rotary filter 16b), so that the end of illumination of the light transmitted through the filter 17R, 17G, and 17B (the end of exposure) can be detected by detecting this identifying means by means of a illumination period end detecting sensor 33. The output of the sensor 33 is input to a synchronizing signal generating device 34 to allow the period during which a drive signal is applied to the CCD 9i (gate period) to be controlled. For example, as the output signal from the sensor 33 delays, the number of pulses (the period during which the drive signal is applied) of the drive signal applied to the CCD 9i decreases.

The rotation of the motor 18i for rotating the rotary filter 16i is controlled by a rotary servo circuit 35 through the motor switch-over circuit 19.

The rotary serve circuit 35 controls the rotation of the motor 18i in such a manner that the rotation is synchronized to the frame frequency (which is 39.97 Hz in the case of the NTSC system) of a video signal.

The image of the object 13 field-sequentially illuminated by the light of R, G, and B colors is formed on the imaging surface of the CCD 9i through the objective lens 8, and the photoelectrically converted signal is read out from the CCD 9i by the application of a drive signal by a CCD drive circuit 41. This drive signal and the signal from the rotary servo circuit 35 are synchronized to a synchronizing signal from the synchronizing signal generating device 34.

The output signal of the CCD 9i is amplified by a preamplifier 43 in the signal processing portion 4, and is then input to a double sampling circuit 45 through an isolation circuit 44 which has the function of protecting a patient from electric shock. The double sampling circuit 45 performs double sampling on the output signal in order to remove the i/f and reset noise contained in the signal, and thereby produces a signal whose S/N ratio has been improved. The signal output from the double sampling circuit 45 is input to a low-pass filter (LPF) 46 where the high frequency components such as CCD carrier are removed from the signal, and the output signal of the low-pass filter 46 is then input to a gamma collecting circuit 47. The signal whose non linear output-input characteristics have been corrected (normally, with gamma=2.2) by the gamma correcting circuit 47 is input to an A/D converter 48 where it is converted to a digital signal, and the digital signal is then stored in frame memory 49R, 49G, or 49B. In other words, the signals obtained when the object is illuminated field-sequentially are stored in the frame memories for each frame. For example, the signal obtained when the red light that has passed through the red transmitting filter 17R is illuminated is stored in the frame memory 49R. After the image data for one frame has been stored in the frame memories 49R, 49G, and 49B, it is output at the same time to corresponding D/A converters 51 where it is converted to an analog signal. Subsequently, the high frequency components are removed from the analog signals by low-pass filters 52, and the signals are then input to horizontal outline enhancing circuits 53. Writing of data into the frame memories 49R, 49G, and 49B and reading-out of data therefrom are controlled by a memory control circuit 54. The output signal of the memory control circuit 54 is generated in synchronizm with the synchronizing signal of the synchronizing signal generating device 34.

After the horizontal outline has been enhanced by the horizontal outline enhancing circuits 53, the signals are amplified by amplifiers 55, and are output from the output terminals connected to 75 ohms of resistors as R, G, B primary color signals. The synchronizing signal is also output from the output terminal of the synchronizing signal generating device 34 through an amplifier 56.

The R, G, B color signals and the synchronizing signal are then input to a monitor to color display the image of the object.

Each of the electronic scopes 2i incorporates the identifying means so as to enable selection of the quantity of light (exposure period) which corresponds to the integration density of the pixels of the electronic scope 2i connected to the apparatus body 6. The signal output from the identifying means is detected by the scope discriminating circuit 21 incorporated in the apparatus body 6.

Figure 6:
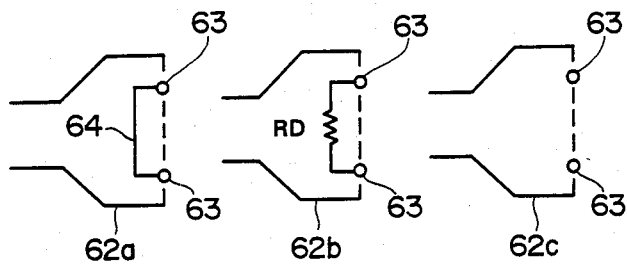
FIG. 6 is a circuit diagram of an identifying means provided in an electronic scope.
Figure 7:
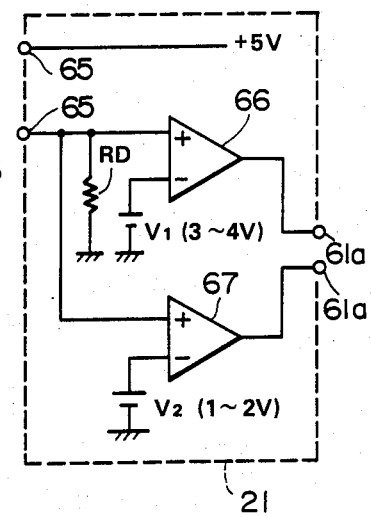
FIG. 7 is a circuit diagram of a scope discriminating circuit.

FIGS. 6 and 7 respectively show the identifying means and the scope discriminating circuit 21.

As shown in FIG. 6, connectors 62a, 62b, and 62b of the electronic scope 2i respectively have two terminals 63 which output a signal identifying the number of pixels 10i of that electronic scope 2i (other signal terminals being omitted). The scope discriminating circuit 21 incorporated in the apparatus body 6 determines the resistance between the two terminals 63, and selects a rotary filter 16i which corresponds to the detected number of pixels on the basis of the result of ditermination.

In the first electronic scope with the minimum number of pixels, the two terminals 63 of the connector 62a are short-circuited through a conductor 64. The two terminals 63 of the connector 62b of the second electronic scope 2b with the second largest number of pixels are connected via a resistor RD of 220 ohms. In the third electronic scope 2c with the maximum number of pixels, the two terminals 63 are opened, this being equivalent to an infinite resistance being connected therebetween.

The scope discriminating circuit 21 has two input terminals 65 for receiving the connector, as shown in FIG. 7. One of the input terminals 65 is connected to a power source of +5 V, while the other input terminal 65 is connected to the non-inverting terminals of comparators 66 and 67, and is grounded through a resistor RD of 220 ohms.

A voltage V1 of 3 to 4 V is applied to the inverting terminal of the comparator 66 from a reference voltage source, and a voltage V2 of 1 to 2 V is applied to the inverting terminal of the comparator 67 from a reference voltage source. The comparators 66 and 67 output from their output terminals 61a a 2-bit signal which corresponds to the number of pixels of the scope.

When the connector 62a of the first electronic scope 2a is connected, the comparators 66 and 67 output logical high signals, respectively. In the case of connection of the connector 62b of the second scope 2b, a logical low signal and a logical high signal are respectively output from the comparators 66 and 67. When the connector 62c of the third scope 2c is connected to the input terminals 65, logical low signals are output from the comparators 66 and 67. These two control signals are applied to the motor switch-over circuit 19 and the filter switch-over circuit 31 so as to enable the amount of illumination (exposure period) suitable for the number of pixels of the selected scope 2i to be set.

In the first embodiment, a drive signal (in particular, a horizontal transfer clock) of the same frequency is used when the signals are read out from CCDs 9i each with different numbers of pixels. If the highest value of the frequency of the drive signal at which the CCD 9i can be operated differs with the CCDs 9i, the frequency of the drive signal is set to the lowest highest value fMIN of the frequency or less (in the CCDs of the same type, the highest value of the frequency is often the same even if the numbers of pixels are different).

Since the drive signal has the fixed frequency, the timing of the two types of pulse which are output from a clamp pulse/sampling pulse generating circuit 68 to the double sampling circuit 45 for double sampling is fixed to a value which corresponds to that of the drive signal of the frequency fMIN. Therefore, a double sampling circuit 45 which operates only with the frequency fMIN is employed, that is, the same double sampling circuit is used even when the number of pixels differs. Even though the CCD 9i contains a different number of pixels, the bandwidth of the signal output from the CCD 9i is defined by the frequency fMIN of the drive signal applied thereto, and the spatial frequency of the obtained signal equals to fMIN/2 by Nyquist's theorem. Therefore, the same low-pass filter 46 which cuts off the frequency fMIN/2 or above is employed for different numbers of pixels. The capacity of the memories 49R, 49G, and 49B is set to a value at which a signal output from the CCD with the maximum number of pixels (that is, the CCD 9c) can be stored. The memory control circuit 54 basically operates in the same manner for different numbers of pixels (when a signal from the CCD 9i with a few number of pixels is stored, the writing of data into the memory may be stopped accordingly).

Further, it is apparent from Nyquist's theorem that it is not necessary to switch over the read-out clock of the memories 49R, 49B, and 49C, the D/A converters 51, and the low-pass filters 52 in accordance with the number of pixels, if the signals read out from the memories 49R, 49G, and 49B are displayed on the monitor in a different size which corresponds to the number of pixels of the employed CCD.

The horizontal outline enhancing circuit 63 basically enhances the image observed at an apparent distance on the monitor with the eyes of a human being. Therefore, the same horizontal outline enhancing circuit may be employed even when number of pixels differs.

A signal is read out from the CCD 9i at a timing shown in FIG. 8.

A reset pulse shown in FIG. 8 (a) and a horizontal transfer clock $\phi$H1 shown in FIG. 8 (b) are output from the CCD drive circuit 41 to the CCD 9i to read out a signal shown in FIG. 8 (c). The clamp pulse/sampling pulse generating circuit 68 to which a frequency-divided clock is input and which forms a waveform generating circuit outputs a clamp pulse shown in FIG. 8 (d) and a sampling pulse shown in FIG. 8 (e).

More specifically, the output signal read out from the CCD 9i using the reset pulse and the horizontal transfer pulse has a reset pulse portion and a feed through portion. Therefore, a clamp pulse which is slightly out of phase with the reset pulse and a sampling pulse which is further out of phase with the reset pulse and which is synchronized to the signal portion of the output signal are generated, and the generated pulses are applied to the double sampling circuit 45 so as to remove the noise component such as reset pulse and thereby improve the S/N ratio.

Figure 9:
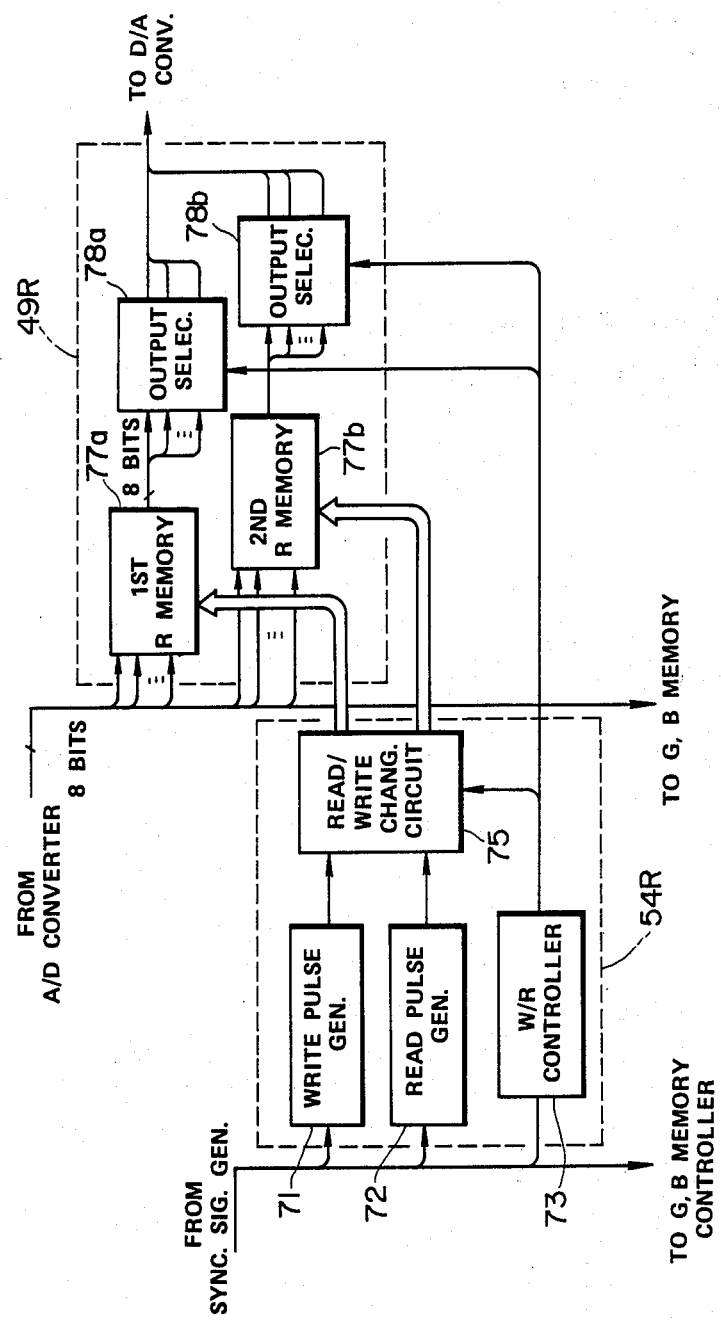
FIG. 9 is a schematic view of a memory and a memory control circuit.

The memory 49R and the memory control circuit 54 R for controlling the memory 49R are formed in the manner shown in FIG. 9.

The master clock of the reference clock generator in the synchronizing signal generating device 34 is input to a write pulse generator 71, a read pulse generator 72, and a write/read controller 73 which constitute an R memory control circuit 54R.

The pulses generated by the write pulse generator 71 and the read pulse generator 72 are applied through a read/write switch-over circuit 75 switched over by the write/read controller 73 to the address terminals of a first R memory 77a and a second R memory 77b which in combination form the R memory 49R.

The A/D converter 48 is connected to the input terminals of the R memories 77a and 77b. The memories 77a and 77b are so controlled that writing and reading-out are conducted alternately. For example, when a signal data obtained when the R light is illuminated is input to the memory 49R via the A/D converter 48, a write mode signal may be applied to the first R memory 77a by the write/read mode controller 73 so that the signal data is stored in the first R memory 77a, while the second R memory 77b is set in a read mode. At this time, the read/write controller 73 applies a write pulse to the first R memory 77a and a read pulse to the second R memory 77b.

The memories 77a and 77b may be a dynamic RAM or a static RAM.

The output terminals of the first and second R memories 77a and 77b are respectively connected to output selecting circuits 78a and 78b which are turned on and off by a loginal high signal or a logical low signal from the write/read controller 73. The output selecting circuit 78a or 78b is turned on when the operation of the corresponding memory is in the read mode subsequent to the write mode, so as to enable the read out signal data to be output to the corresponding D/A converter 51 therethrough. The first and second memories 77a and 77b have a capacity large enough to store the data obtained from the CCD with the maximum number of pixels. If a CCD with a few number of pixels is used, part of the capacity is used.

The same type of read pulse generator 72 is used in the memory control circuits 54R, 54G, and 54B. More specifically, the signal data stored in the R, G, and B memories 49R, 49G, and 49B is read out at the same time in the read mode, and the memories 49R 49G and 49B are each composed of two memories so as to enable writing to be conducted separately from reading without being disturbed by the reading operation.

Since read-out from the R, G, and B memories 49R, 49G, and 49B is performed concurrently in the read mode, one read pulse generator 72 may be employed in place of three different generators.

The data read out from the memories 49R, 49G, and 49B at the same time is converted to analog signals by the corresponding D/A converters 51, and the analog signals are input to the corresponding low-pass filters 52.

Figures 10, 11D:
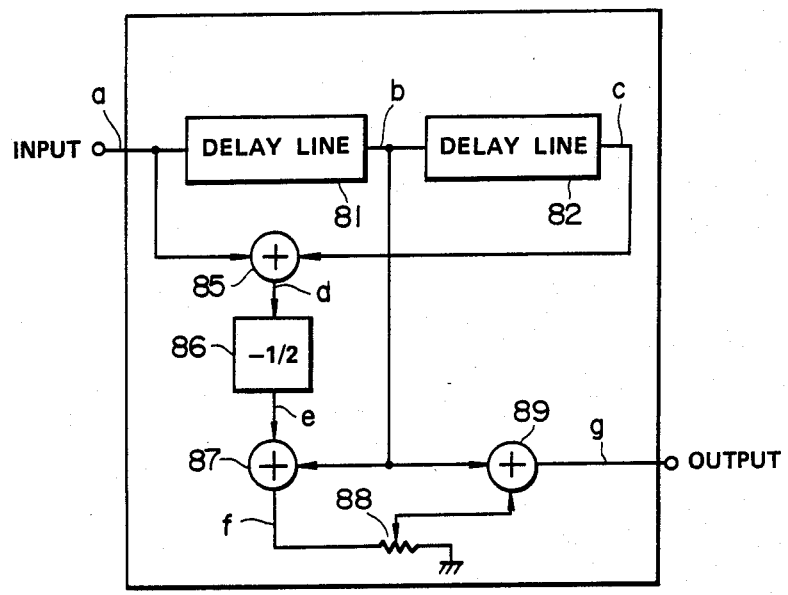
FIG. 10 is a schematic view of a horizontal outline enhancing circuit.
Figure 11A:
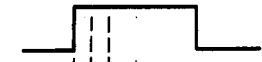
FIG. 11 illustrates the operation of the horizontal outline enhancing circuit.
Figure 11B:
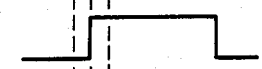
Figure 11C:
Figure 11E:
Figure 11F:
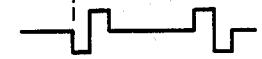
Figure 11G:

The signals from which the high-frequency components have been removed by being passed through the low-pass filters 52 are input to the corresponding horizontal outline enhancing circuits 63. FIG. 10 shows the structure of the horizontal outline enhancing circuit 63. The signal input through the input terminal from the low-pass filter 52 is delayed by a first delay line 81 by a time Ta, and is then delayed by a second delay line 82 by a time Ta. Therefore, if the signal applied to the input terminal is such that shown in FIG. 11 (a), signals which have passed the delay lines 81 and 82 are those shown in FIGS. 11 (b) and (c).

The signal input from the input terminal of the horizontal outline enhancing circuit and the signal which has been delayed by the second delay line 82 are added by a first adder 85 to form a signal shown in FIG. 11 (d). The thus-formed signal is supplied to a coefficient multiplier 86 where it is multiplied by $-\frac{1}{2}$ to form a signal shown in FIG. 11 (e). Subsequently, this signal is input to an adder 87 where it is added to the signal which has passed through the first delay line to form a signal shown in FIG. 11 (f). This signal is input to a third adder 89 through a variable resistor 88 for adjusting the amount of enhancement of the outline, and is added to the signal which has passed through the first delay line 81 to form a signal shown in FIG. 11 (g) which is output from the output terminal to a subsequent stage as a horizontal outline enhanced signal.

In this embodiment, no alterations of the signal processing circuit 4 are necessary to display the image in color on the monitor even when the number of pixels of the CCD 9i differs. The illumination period is changed in accordance with the number of pixels of the CCD; if a CCD with a few number of pixels is employed, the illumination period is made longer than that for the CCD with a large number of pixels, allowing the S/N ratio of the output signal to be improved.

In the first embodiment, the illumination period is changed in accordance with the number of pixels in the CCD. However, it may be fixed to that of the rotary filter (16c in FIG. 3) employed with the CCD with the maximum number of pixels. In this case, no scope identifying means is necessary. Nor are required the scope descriminating circuit 21 and the filter switch-over means, enabling all of the circuit conditions to be exactly the same. This results in a highly reliable and rational electronic endoscope apparatus.

In this case, the time at which the CCDs are exposed to light is determined by the maximum read-out period (the maximum number of pixels), and the S/N ratio cannot be optimized when a CCD with a few number of pixels (which requires a short read-out period) is employed. However, the sensitivity of the CCD has been improved, so it is possible to provide an electronic endoscope apparatus which is sufficiently effective when used in diagnosis.

Figure 12:
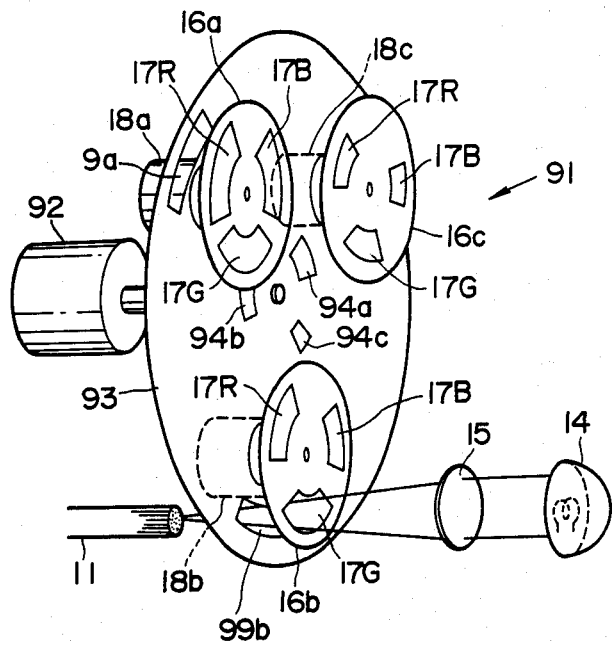
FIG. 12 is a schematic perspective view of a light source portion, showing a second embodiment of the present invention.

A second embodiment of the present invention will be described below with reference to FIG. 12 which shows the essential parts thereof.

Whereas in the first embodiment three rotary filters 16i are moved for selection, a light source portion 91 of this embodiment involves rotation of the rotary filters for selection.

A rotary disk 93 is mounted on the rotary shaft of a filter switch-over motor 92, and three motors 18i are in turn mounted on the rotary disk 93 at three locations in the circumferential direction. Rotary filters 16i with color transmitting filters 17R, 17G, and 17B of different lengths are mounted on the motors 18i, as in the case of the first embodiment.

In order to detect the rotary filter 16i which has placed in the optical path by the rotation of the rotary disk 93, a filter detecting reflecting plate 94i for identifying the position of the motor 18i is provided on the rotary disk 93 while a reflection type photo sensor 95 (not shown in FIG. 12; see FIGS. 13 and 14.) is located at one circumferential position at which it faces the reflecting plate 94i.

Figure 13:
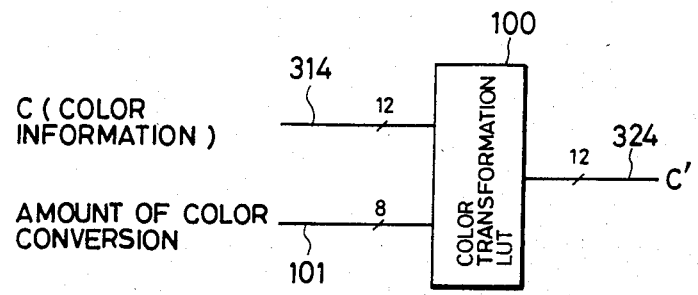
FIG. 13 is a plan view of a filter position detecting sensor.
Figure 14A:
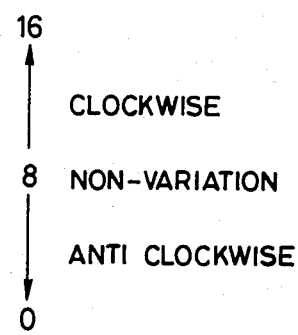
FIG. 14 illustrates detection of the position of the rotary filter by a sensor element.
Figure 14B:
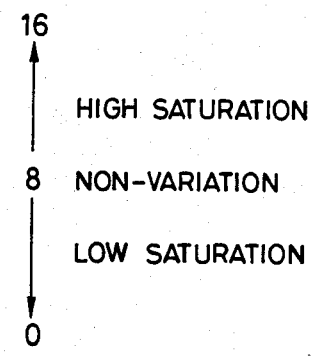

As shown in FIG. 13, the reflection type photo sensor 95 is comprised of three photo sensor elements 96i each of which is in turn composed of a light-emitting diode 97I and a photo diode 98I (or a photo transistor), as shown in FIG. 14. The rotary filter 16i which has situated in the optical path can be identified by the number of photo diodes 98I which receive the light of the light-emitting diodes 97I, the number changing due to difference in the length of the reflecting plate 94i.

The rotary disk 93 is provided with a notch 99i which is situated in the optical path when the rotary filter 16i is situated in the light path and through which the light is led to the light guide 11 (alternatively, transparent plates may be provided).

The second embodiment is operated substantially in the same manner as that in which the first embodiment is operated.

Figure 15:
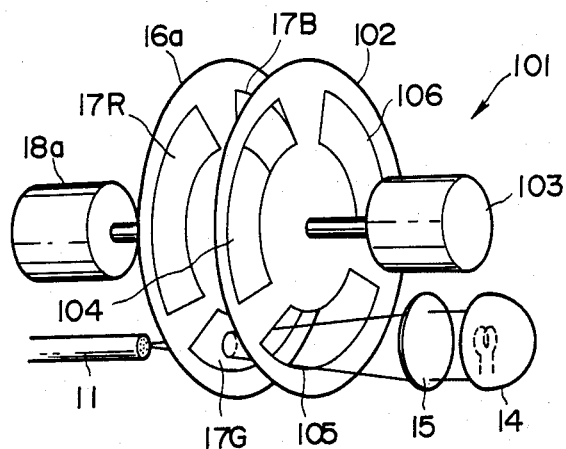
FIG. 15 is a schematic perspective view of a light source portion, showing a third embodiment of the present invention.

FIG. 15 shows a light source portion 101 of a third embodiment of the present invention which adopts the exposure adjusting method utilizing a serve mechanism.

In this embodiment, an exposure period adjusting filter 102 is disposed in such a manner as to face a color separating rotary filter 16a having the longest filters which is mounted on the shaft of a motor 18a. The exposure period adjusting filter 102 is rotated by a motor 103.

Figures 16A, 16B, 16C:
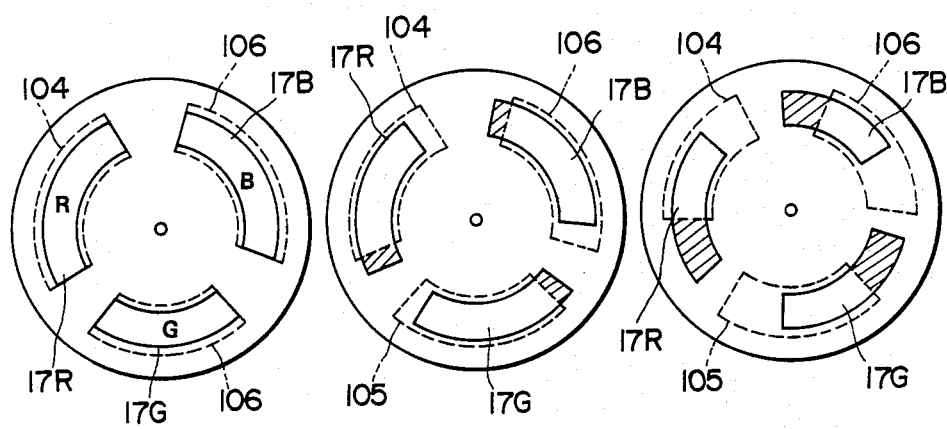
FIG. 16 illustrates the illumination period which is changed in accordance with the number of pixels.

The adjusting filter 102 has openings 104, 105, 106 having the same length (and a slightly larger width) as that of the filters 17R, 17G, and 17B provided on the color separating rotary filter 16a. When the motors 18a and 103 are rotated at the same speed, the filters 17R, 17G, and 17B respectively face the openings 104, 105, and 106 during rotation, as shown in FIG. 16 (a), maximizing the amount of light that is transmitted through the filters and providing illumination suitable for the CCD 9a with the minimum number of pixels. In the case of the CCD 9a with the medium number of pixels, the motor 103 is rotated at a slightly lower speed than that of the motor 18a and by a reference signal of the same frequency (which is 29.97 Hz in the case of the NTSC system), as shown FIG. 16 (b). At this time, the hatched portions of the filters 17R, 17G, and 17B are shielded, reducing the illumination periods and elongating the read-out periods accordingly.

In the case of the CCD with the maximum number of pixels, the drive signal for the motor 103 further lags that for the motor 18a with respect to the phase, increasing the shielded portions of the filters which are used for read-out of a signal.

Figure 17:
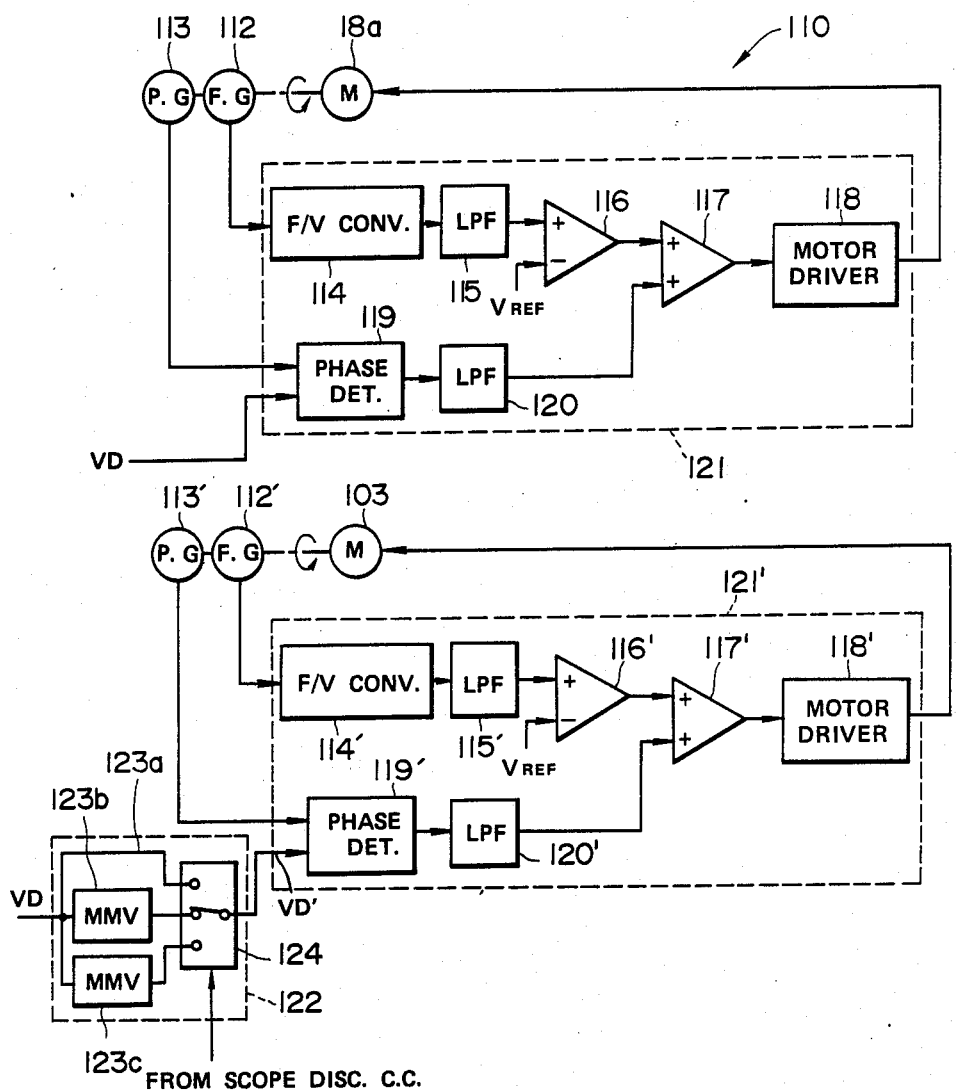
FIG. 17 is a circuit diagram of a motor control circuit for controlling the rotation of a motor.

FIG. 17 shows the structure of a servo circuit 110 for controlling the phase differece of the drive signals for the motors 18a and 103.

The motor 18a is mechanically connected to a frequency generator (hereinafter referred to as a F.G.) 112 and to a pulse generator (hereinafter referred to as a P.G.) 113. The F.G. 112 outputs pulses of a frequency proportional to the rotational speed of the motor 18a, and the P.G. 113 outputs a pulse for each rotation of the motor 18a which is used for detecting the rotational speed of the motor.

The output of the F.G. 112 is input to a frequency/voltage (F/V) converter 114 where it is converted to a voltage proportional to the frequency. Thereafter, the high-frequency component is removed from the signal by a low-pass filter 115, and the signal is then input to a differential amplifier 116. The other input terminal of the differential amplifier 116 is connected to a reference voltage VREF. The output of the differential amplifier 116 is applied to the motor 18a through an adder 117 and a motor driver 118, thus forming a feedback servo loop in which the rotational speed of the motor 18a (which is about 1800 r.p.m. in the case of the NTSC system) is controlled so that the difference between two voltages applied to the differential amplifier 116 becomes zero.

It is necessary for the drive signal for the motor 18a to be put in phase with a vertical synchronizing signal VD from the viewpoint of the operation of the system. Therefore, the output of the P.G. 113, together with the vertical synchronizing signal VD which serves as a reference signal, is input to a phase detector 119 where the phases of the VD and the pulse from the P.G. 113

(one pulse per rotation) are compared. The output of the phase detector 119 is then applied to the adder 117 through a low-pass filter 120, and is added to the output signal of the differential amplifier 116, enabling the motor 18a to be rotated in synchronism with the VD.

Rotation of the motor 103 for rotating the adjusting filter 102 is controlled by a servo circuit 121' in the servo circuit 110, whereas the rotation of the rotary filter 16a is controlled by a servo circuit 121 having the above-described structure. A VD is supplied to the servo circuit 121' after it has passed through a phase varying circuit 122. The same reference numerals are used to denote the same components of the servo circuit 121 and 121', the numerals denoting the components of the serve circuit 121' being provided with an apostrophe.

The phase varying circuit 122 includes monostable multivibrators (hereinafter referred to as MMVs) 123b and 123c, a line 123 for directly outputting the VD, and a multiplexer 124 for switching over these MMVs 123b and 123c and the line 124 by a scope discriminating signal. The MMVs 123b and 123c are set to output pulses after different delayed times (which respectively correspond to the hatched portions shown in FIG. 16 (b) and (c)).

In consequence, the pulses of the P.G. 113 are synchronized to the vertical synchronizing signal VD input to the phase detector 119 by the servo system for the motor 18a, as shown in FIGS. 18 (a) and (b). When a CCD with a medium number of pixels is selected, the MMV 123b is selected in the servo system for the motor 103, and the vertical synchronizing signal VD' input to the phase detector 119' thereby slightly lags the VD 119 by a phase D, as shown in FIG. 18 (c). Similarly, the pulses from the P.G. 113' also lag those shown in FIG. 18 (b) by a phase D, as shown in FIG. 18 (d).

In the case of a CCD with the maximum number of pixels, switch-over of the multiplexer 124 is controlled such that the phase difference further increases.

The third embodiment has the advantage that the light source portion 101 can be made relatively compact.

The structure shown in FIG. 17 may be simplified by the application of the drive signal for the motor 18a to the motor 103 for rotating the adjusting filter through a delay circuit (in this case, the control of the motor 103 is an open loop). The delay circuit may be the one with taps whose positions are switched over by the scope discriminating signal.

In the above-described embodiments, the data stored in the memories 49R, 49B, and 49B is read out by the clock of the same frequency even if the number of pixels differs. However, a clock of a frequency which differs in accordance with the number of pixels may also be employed, with the characteristics of the low-pass filters 52 being switched over in accordance with the clock. This operation is described in the specification of Japanese Patent Application No. 62-17982 which is disclosed by the present inventor, and further description is therefore omitted.

The same rotary filter may be employed for different numbers of pixels with the intensity or the amount of light illuminated by the lamp being increased for a CCD with a few number of pixels.

The above-described embodiments employ a horizontal transfer clock of the same frequency even when the filters are switched over in accordance with a connected scope. In that case, the number of vertical transfer pulses may be the same or it may be changed in accordance with the number of pixels 10i.

As will be understood from the foregoing description, in the present invention, even when the number of pixels of a solid-state image element incorporated in an endoscope as an imaging means differs, the drive signal including a horizontal transfer clock of the fixed frequency is applied to the solid-state image element so as to read out a signal therefrom. In consequence, the signal processing can be performed by simply circuitry.

What is claimed is:

1. An endoscope apparatus comprising:
   first and second endoscopes respectively including first and second long inserted portions, first and second light emitting means for respectively emitting light from the forward ends of said first and second inserted portions, first and second objective lens systems respectively disposed at the forward ends of said first and second inserted portions for forming the image of an object, and first and second solid-state image elements for respectively converting the images formed by said first and second objective lens systems to electrical signals, said first and second solid-state image elements containing a different number of pixels;
   a drive signal generating means for outputting to said first or second solid-state image element a drive signal including a horizontal transfer clock of fixed frequency even when said first and second solid-state image elements have a different number of pixels; and
   a video signal processing means for processing a signal read out from said first or second solid-state image element by the application of said drive signal so as to generate a predetermined video signal and for outputting said video signal to a monitor means for visual display.

2. An endoscope signal processing apparatus comprising:
   first and second endoscopes respectively incorporating first and second solid-state image elements each with a different number of pixels as imaging means;
   a drive signal generating means on which said first or second endoscope is mounted, said drive signal generating means generating a drive signal including a horizontal transfer clock of a fixed frequency to said first or second solid-state image element regardless of said number of pixels thereof; and
   a video signal processing means for processing a signal output from said first or second solid-state image element by the application of said drive signal so as to generate a predetermined video signal.

3. An endoscope apparatus according to claim 1, wherein at least one of said first and second endoscope means comprises an electronic scope in which said first or second solid-state image element is disposed at a positon at which an image is formed by said first or second objective lens system.

4. An endoscope apparatus according to either one of claims 1 or 3, wherein at least one of said first and second light emitting means comprises a light guide means whose light emitting end is disposed at the forward end of said first or second inserted portion, said light guide means transferring the light supplied from a light source means to the incident end thereof.

5. An endoscope apparatus according to claim 4, wherein said light source means is a field-sequential type illumination means for successively outputting a plurality of light rays with different wavelengths.

6. An endoscope apparatus according to claim 5, wherein said illuminating means includes a lamp for emitting light with wavelengths in the visible range, a rotary color filter with a plurality of color transmitting filters for respectively transmitting light with different wavelengths mounted on a rotary wheel of said rotary color filter, and a motor for driving said rotary color filter.

7. An endoscope apparatus according to either one of claims 1 or 3, wherein said light emitting means has means for switching over the exposure period for a solid-state image element in accordance with the number of pixels thereof.

8. An endoscope apparatus according to either one of claims 1, or 3, wherein said first and second endoscope means each have a source for generating information identifying the number of pixels of said first or second solid-state image element.

9. An endoscope apparatus according to claim 8, wherein said drive signal generating means and said video signal processing means are accommodated in the same casing, and said casing incorporates a connecting portion to which said first and second endoscopes can be connected, and an interpreting means for interpreting the information of said information generating means by this connection.

10. An endoscope apparatus according to either one of claims 1 or 2, wherein said video signal processing means does not change the characteristics of a system for processing a video signal even when the number of pixels differs.

11. An endoscope apparatus according to either one of claims 1 or 2, wherein said video signal processing means has a means for switching over the characteristics with which said video signal processing means processes a video signal in accordance with the number of pixels of said first and second solid-state image element.

12. An endoscope apparatus according to claim 8, wherein said light emitting means has a means for switching over the exposure period in accordance with the number of pixels of said first and second solid-state image elements.

13. An endoscope apparatus according to claim 8, wherein said video signal processing means has a means for switching over the characteristics of the system for processing a video signal in correspondence with the number of pixels of said first and second solid-state image elements.

14. An endoscope apparatus according to claim 11, including means for interpreting the information of said information generating means, the signal output from said interpreting means being applied to said switching over means for automatic switch-over operation.

15. An endoscope apparatus according to claim 5, wherein said video signal processing means includes a first low-pass filter means for cutting off unnecessary higher harmonic waves, an A/D converting means for conveting the signal that has passed through said first low-pass filter means to a digital signal, a digital memory means for temporarily storing the digital signal that has passed through said A/D converting means, a D/A converting means for converting the digital signal read out from said digital memory means to an analog signal; and a second low-pass filter means for cutting off the higher harmonic waves of the analog signal output from said D/A converting means.

16. An endoscope apparatus according to claim 15, including a means for switching over at least one of the read-out clock of said digital memory means, the D/A converting rate of said D/A converting means and the frequency cut off by said second low-pass filter.

17. An endoscope apparatus according to claim 16, wherein said video signal processing means includes an outline enhancing means disposed prior to or subsequent to said second low-pass filter means for enhancing the outline of an input signal, and a means for switching over the outline enhancing frequency used by said outline enhancing means.

18. An endoscope apparatus according to claim 6, wherein said illumination means includes a second rotary color filter having a second rotary wheel on which a plurality of color transmitting filters having the same characteristics as those of said plurality of color transmitting filters and different lengths are mounted in the circumferential direction, a second motor for driving said second rotary color filter, and a switching over means for disposing in the light path of the illumination either of said rotary color filter and said second rotary color filter by moving said rotary color filter and said second rotary color filter.

19. An endoscope apparatus according to claim 6, wherein said illumination means includes a second rotary wheel having openings at positions at which they face said plurality of color transmitting filters, said second rotary wheel facing said rotary wheel, a second motor for rotating said second rotary wheel, means for controlling the rotational phases of said second motor and said motor, and a means for switching over the amount of shift of the rotational phases of said color transmitting filters and said openings.

20. An endoscope apparatus according to claim 7, wherein said first and second endoscope means each have a source for generating information identifying the number of pixels of said first or second solid-state image element.

21. An endoscope apparatus according to claim 20, wherein said drive signal generating means and said video signal processing means are accommodated in the same casing, and said casing incorporates a connecting portion to which said first and second endoscopes can be connected, and an interpreting means for interpreting the information of said information generating means by this connection.

22. An endoscope apparatus according to claim 20, wherein said light emitting means has a means for switching over the exposure period in accordance with the number of pixels of said first and second solid-state image elements.

23. An endoscope apparatus according to claim 20, wherein said video signal processing means has a means for switching over the characteristics of the system for processing a video signal in correspondence with the number of pixels of said first and second solid-state image elements.

24. An endoscope apparatus according to claim 12, including means for interpreting the information of said information generating means, the signal output from said interpreting means being applied to said switching over means for automatic switch-over operation.

25. An endoscope apparatus according to claim 13, including means for interpreting the information of said information generating means, the signal output from said interpreting means being applied to said switching over means for automatic switch-over operation.

26. An endoscope apparatus according to claim 22, including means for interpreting the information of said information generating means, the signal output from said interpreting means being applied to said switching over means for automatic switch-over operation.

27. An endoscope apparatus according to claim 13, including means for interpreting the information of said information generating means, the signal output from said interpreting means being applied to said switching over means for automatic switch-over operation.

28. An endoscope apparatus according to claim 6, wherein said video signal processing means includes a first low-pass filter means for cutting off unnecessary higher harmonic waves, an A/D converting means for converting the signal that has passed through said first low-pass filter means to a digital signal, a digital memory means for temporarily storing the digital signal that has passed through said A/D converting means, a D/A converting means for converting the digital signal read out from said digital memory means to an analog signal; and a second low-pass filter means for cutting off the higher harmonic waves of the analog signal output form said D/A converting means.

29. An endoscope apparatus according to claim 28, including a means for switching over at least one of the read-out clock of said digital memory means, the D/A converting rate of said D/A converting means and the frequency cut off by said second low-pass filter.

30. An endoscope according to claim 29, wherein said video signal processing means includes an outline enhancing means disposed prior to or subsequent to said second low-pass filter means for enhancing the outline of an input signal, a means for switching over the outline enhancing frequency used by said outline enhancing means.

* * * * *